3,070,454
NON-CORROSIVE COMPOSITION

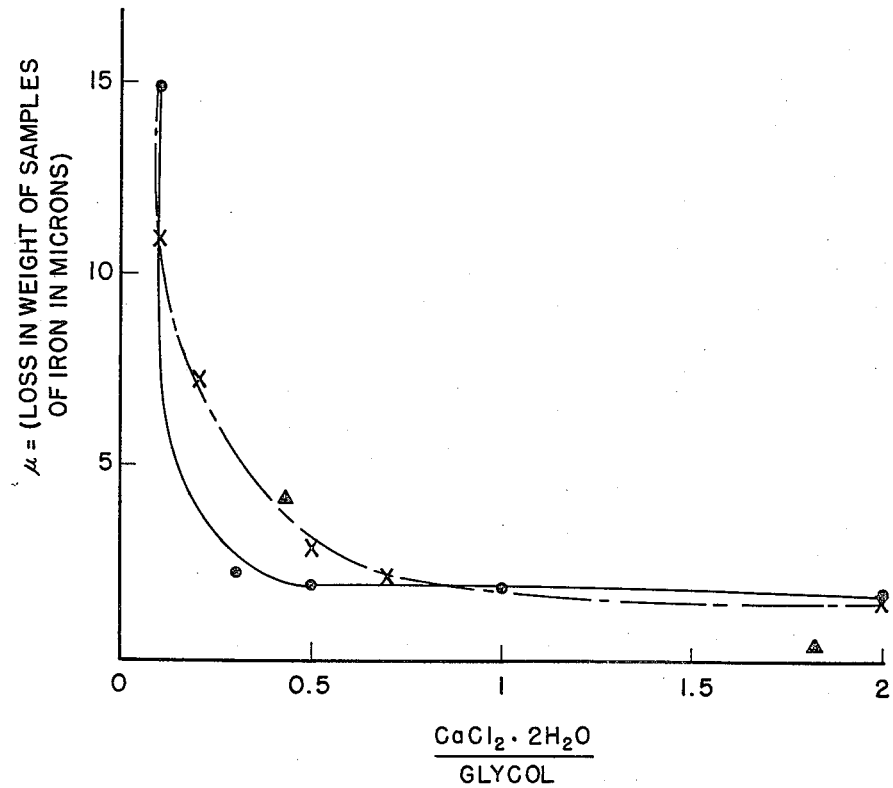

Gerard R. F. Samman, Rueil, and George Duruy, Paris, France, assignors to Shell Oil Company, New York, N.Y., a corporation of Delaware
Filed Aug. 22, 1961, Ser. No. 133,252
Claims priority, application France Aug. 31, 1960
9 Claims. (Cl. 106—278)

The invention relates to non-corrosive compositions containing ferric chloride suitable for incorporation in a bituminous composition.

It is known to add ferric chloride to asphaltic bitumens or bituminous compositions for various purposes, thus the U.S. patent specification 2,313,759 describes the addition of an aqueous solution of $FeCl_3$ to bituminous compositions in order to improve their adhesiveness to a mineral aggregate.

It is also known to blow asphaltic bitumens in the presence of ferric chloride as catalyst. See, for example, the British patent specification 520,525 according to which an aqueous solution of ferric chloride is first added to a small amount of material to be blown in order to prevent the production of excessive foam, after which the resultant mixture is added to the remainder of the material to be blown.

Although the incorporation of ferric chloride into a bitumen or bituminous composition has several advantages, there are considerable drawbacks attaching to the use of an aqueous solution of ferric chloride.

An aqueous solution of ferric chloride is very corrosive and this leads to great difficulties during handling of the solutions and storage. Consequently a bituminous composition in which such a solution is incorporated may be corrosive, and this may lead to difficulties both during manufacture and storage and with certain applications. Although the corrosion caused by an aqueous solution of ferric chloride dispersed in the form of a water-in-oil emulsion is reduced, it is still considerable.

Moreover, as stated above, when an aqueous solution of ferric chloride is introduced into the bitumen there is considerable foaming and overflowing. The presence of anti-foaming agents such as silicones may reduce the amount of foaming to a certain extent, but the increase in volume of the bituminous mass is still great enough to cause manufacturing difficulties. Moreover, when the aqueous solution of ferric chloride is being introduced, water vapor is liberated which condenses on the cold parts of the mixing vessel; this water is corrosive as it has a pH in the range 1:2.

It has now been found that the said drawbacks may be overcome by employing a solution of ferric chloride of which the solvent consists of glycol having a calcium chloride content of such a proportion that the calcium chloride glycol ratio by weight is at least 0.3, the calcium chloride being calculated as $CaCl_2.2H_2O$.

By means of the above solution it is possible to prepare a non-corrosive bituminous composition. At the same time the method prevents the excessive foam production which arises when the ferric chloride is added to the hot bitumen and which generally causes serious difficulties during the manufacture of the bituminous composition. The method, according to the invention, may be used in any of the following cases, viz. when the addition of ferric chloride is intended to influence the consistency of the bitumen, when it is required for facilitating subsequent blowing, or improving the adhesiveness to a mineral aggregate. It has been found that ferric chloride solutions according to the invention are not corrosive per se and therefore do not cause corrosion when added to a bitumen or bituminous compositions; hence the solution may be readily prepared beforehand and stored ready for use.

The attached drawing shows a graph in which as a measure of the corrosion caused by a ferric chloride solution, the loss in thickness of samples of iron (in microns), determined by a method which will be explained in detail in the examples, is plotted as a functon of the $CaCl_2$ to glycol ratio in $FeCl_3$ solutions, the $FeCl_3$ to $CaCl_2$ ratio being kept constant in the various experiments. The graph shows that where the $CaCl_2$ to glycol ratio is higher than 0.5 the corrosion is slight and practically constant. A calcium chloride to glycol ratio in the range 0.5:1 is preferred.

The graph shows that according to the invention it is possible for slight corrosion to occur even when the $FeCl_3.6H_2O$ to $CaCl_2.2H_2O$ ratio is fairly high, and this is very important in practice.

Although it is possible to use anhydrous ferric chloride instead of crystallized ferric chloride, experience has shown that when anhydrous ferric chloride is used it is difficult to introduce the calcium chloride into the solution. It is therefore preferred to incorporate the ferric chloride in the solution in the form of crystallized hydrate, preferably in the form of $FeCl_3.6H_2O$.

Preference is given to a ferric chloride to calcium chloride ratio in the range 1.5:30, the calcium chloride being calculated as $CaCl_2.2H_2O$ and the ferric chloride as $FeCl_3.6H_2O$. With too high a ratio there is a risk of crystallization occurring especially as in this case the solutions are supersaturated and very unstable.

The ferric chloride solution according to the invention is preferably prepared by adding crystallized ferric chloride and crystallized calcium chloride to the glycol with stirring, the glycol preferably being heated at a temperature of the order of 70° C. To promote solution the temperature is held at about 70° C. The presence of water in the apparatus should be avoided during the operation and the subsequent storage of the solution.

When it is desired to incorporate the ferric chloride solution in a bitumen, the ferric chloride solution according to the invention is preferably first dispersed in a hydrocarbon oil which should have a low content of aromatic compounds. This oil preferably contains less than 30% by weight of aromatic compounds, as determined by percolation with silica gel, described in the "Journal of the Institute of Petroleum," 36 (1950), pages 89–104. Examples of suitable oils are distillates of crude paraffins such as Middle East crudes.

It is desirable to regulate the ferric chloride solution content in the dispersion to prevent excessive viscosity. Hence the dispersion according to the invention preferably varies in composition from 1 part by weight of hydrocarbon oil and 1 part by weight of ferric chloride solution to 20 parts by weight of hydrocarbon oil and 1 part by weight of ferric chloride solution. The dispersion may be prepared with a suitable homogenizer, for example, a colloid mill.

The dispersion is afterwards incorporated in the bitumen. Use is preferably made of 1 to 50 parts by weight of bitumen to 1 part by weight of dispersion. The bitumen is heated to a temperature at which it is liquid enough to permit ready admixture with a dispersion. The bituminous composition may be homogenized by any conventional method such as stirring, pumping or blowing with air or vapor. The dispersion, slightly heated at 30° C.–40° C., is preferably mixed with a bitumen heated at 140°C.–160° C.

In many cases when bitumen is used, for example, in road construction, it has to be heated to a considerable degree to render it fluid enough for application. In some cases the bitumen is blended with a volatile hydrocarbon to reduce the need for heating. Such a product is commonly known in the industry as a "cutback."

A bituminous composition consisting of a cutback and a solution according to the invention, or a dispersion of the solution according to the invention in a hydrocarbon oil, may also be prepared. The composition of the cutback is preferably such as to contain 20 to 200 parts by weight of cutback to one part by weight of the solution according to the invention.

When it is desired to incorporate the ferric chloride solution in a fluid cutback the ferric chloride solution may be directly added to the cutback, omitting the dispersion phase. The ferric chloride solution may also be dispersed in a very fluid cutback (viz. one having a viscosity of less than 400 cs.) (25° C.), and the resultant cutback then incorporated in a bitumen. According to another embodiment, a dispersion of ferric chloride in a hydrocarbon oil is added to a bitumen and a solvent is then added to the resultant mixture in order to obtain a cutback. Also the ferric chloride solution may be dispersed in a mixture consisting of a hydrocarbon oil having a low content of aromatic compounds and the solvent for cutback, and the bitumen then fluxed with the resultant dispersion in order to obtain the desired cutback.

The following examples further illustrate the invention.

EXAMPLE I

Four series of experiments were carried out with solutions of ferric chloride in a solvent consisting of glycol containing calcium chloride. The ferric chloride to calcium chloride ratio was constant in each series, but it increased continually from one series to the next. On the other hand, the calcium chloride to glycol ratio increased constantly in the same series.

In order to prepare the solutions, the glycol was first introduced into a paddle mixer. It was heated at 70° C. and the calcium chloride then gradually added in flakes with stirring and the ferric chloride in the form of crushed crystals. In order to promote solution, the temperature is held at about 70° C. The presence of water in the apparatus during the operation was avoided.

The corrosion of the resultant solutions was determined by the loss in weight of the samples of iron in the experiments conducted as follows:

The samples consist of metal panels 18 mm. wide and 1.5 mm. thick immersed to a depth of 200 mm. in the solution to be examined. The average temperature was 20° C.

After 24 hours of experiments, the panels were rapidly washed with water and then with alcohol, dried at 110° C. and then weighed. Difference in weight has been translated in loss of thickness in microns, allowing for the surface immersed.

First Series of Experiments

In this series the ratio of the concentration by weight of the crystallized ferric chloride to the concentration by weight of crystallized calcium chloride was invariably 2.5, viz. in every case the ratio was:

$$\frac{FeCl_3.6H_2O}{CaCl_2.2H_2O}=2.5$$

The results are listed in the following Table I (percentages are percentages per weight):

TABLE I

| Nos. | $\frac{CaCl_2.2H_2O}{glycol}$ | $FeCl_3.6H_2O$ | $CaCl_2.2H_2O$ | Glycol | Loss of weight in microns |
|---|---|---|---|---|---|
| | | Percent | Percent | Percent | |
| 1 | 0.42 | 42.5 | 17.0 | 40.5 | 4.2 |
| 2 | 1.82 | 61.8 | 24.7 | 13.5 | 0.4 |

The table shows that the loss in weight of the parts is much less when the

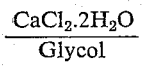

ratio is higher.

Second Series of Experiments

In this series of experiments, the constant ratio in question was:

$$\frac{FeCl_3.6H_2O}{CaCl_2.2H_2O}=5$$

The results are listed in the following Table II (percentages are percentages by weight):

TABLE II

| Nos. | $\frac{CaCl_2.2H_2O}{glycol}$ | $FeCl_3.6H_2O$ | $CaCl_2.2H_2O$ | Glycol | Loss in weight in microns |
|---|---|---|---|---|---|
| | | Percent | Percent | Percent | |
| 3 | 0.1 | 31.25 | 6.25 | 62.50 | 11 |
| 4 | 0.2 | 45.45 | 9.10 | 45.45 | 7.2 |
| 5 | 0.5 | 62.50 | 12.50 | 25.00 | 3.1 |
| 6 | 0.7 | 67.30 | 13.45 | 19.25 | 2.3 |
| 7 | 2.0 | 77.00 | 15.40 | 7.60 | 1.4 |

It can again be seen that the loss in weight decreases with an increasing

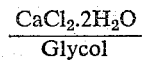

ratio.

It was noticeable that none of the solutions prepared at 70° C. gave any crystalline deposit after being stored for 48 hours at 20° C. After 8 days only solution No. 7 gave a deposit.

Third Series of Experiments

In this series of experiments the constant ratio in question was:

$$\frac{FeCl_3.6H_2O}{CaCl_2.2H_2O}=10$$

The results are listed the following Table III (percentages are percentages by weight):

TABLE III

| Nos. | $\frac{CaCl_2.2H_2O}{glycol}$ | $FeCl_3.6H_2O$ | $CaCl_2.2H_2O$ | Glycol | Loss in weight in microns |
|---|---|---|---|---|---|
| | | Percent | Percent | Percent | |
| 8 | 0.1 | 47.60 | 4.80 | 47.60 | 14.9 |
| 9 | 0.3 | 69.70 | 7.00 | 23.30 | 2.3 |
| 10 | 0.5 | 76.90 | 7.70 | 15.40 | 2.0 |
| 11 | 1.0 | 83.30 | 8.35 | 8.35 | 1.8 |
| 12 | 2.0 | 86.95 | 8.70 | 4.35 | 1.5 |

It can be seen that the loss in weight decreases with an increasing

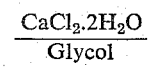

ratio. When $$\frac{CaCl_2.2H_2O}{Glycol}=2$$

the loss in weight of the panels is 1.5 microns with a ratio of $$\frac{FeCl_3.6H_2O}{CaCl_2.2H_2O}=10$$

whereas previously there was a loss in weight of 1.4 for a

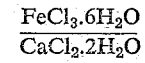

ratio of half this value.

None of the solutions prepared at 70° C. gave any deposit after being stored at 20° C. for 48 hours. After a week only solution No. 12 gave a crystalline deposit.

*Fourth Series of Experiments*

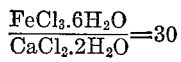
$$\frac{FeCl_3.6H_2O}{CaCl_2.2H_2O}=30$$

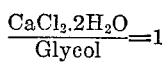
$$\frac{CaCl_2.2H_2O}{Glycol}=1$$

The loss in weight was 2.3 microns.
This figure is of the same order as those previously found with a

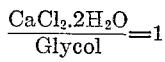
$$\frac{CaCl_2.2H_2O}{Glycol}=1$$

Unfortunately this solution has such a concentration of crystallized ferric chloride that it crystallizes after being left to stand for 3 days at 20° C.

In the drawing, the data obtained is shown on a graph. As stated in the description, when the $CaCl_2$ to glycol ratio is higher than 0.5 corrosion is already slight, and when this ratio exceeds 1 it remains practically constant, irrespective of the $FeCl_3$ to $CaCl_2$ ratio of the solution.

For comparison, the corrosion resulting from aqueous solutions of ferric chloride according to the method used was determined in order to ascertain the corrosion of the solutions according to the invention.

The following values were obtained:

TABLE IV

| $FeCl_3.6H_2O$ concentration of the solution, percent | Loss in weight corrosion in microns |
| --- | --- |
| 30 | 31 |
| 40 | 44 |
| 50 | 54 |
| 60 | 74 |
| 70 | 26 |
| 90 | 5 |

It can be seen that a corrosion resulting from aqueous solutions of ferric chloride is considerable and much greater than that resulting from the solutions according to the invention.

EXAMPLE II 2000 kg. of a ferric chloride solution were prepared as follows:

280 kg. of glycol were first introduced into a paddle mixer. Heating was applied at 70° C. and then about 19 kg. of flaked calcium chloride added, followed by 50 kg. of crushed crystallized ferric chloride, and this was continued until 480 kg. of calcium chloride and 1240 kg. of ferric chloride had been added together. To assist solution the temperature was held at about 70° C. The presence of water in the apparatus should be avoided during the operation.

(1) INCORPORATION OF THE FERRIC CHLORIDE IN A BITUMEN

8% of the ferric chloride solution referred to above was dispersed in 92% of hydrocarbon oil having a content of aromatic compounds determined by the percolation method with 22% by weight of silicon gel at a temperature of the order of 50° C.

20% of the resultant dispersion slightly heated at 30° C.–40° C. was slowly introduced into 80% of 40/50 bitumen (viz. a bitumen having a penetration in the range 40 to 50 at 25° C., using the standard penetration test procedure prescribed in ASTM Method D5), heated at 140° C.–160° C. and the whole mixed. The result is a bitumen of the 180/220 type (i.e. having a penetration in the range of 180 to 220 at 25° C.).

(2) INCORPORATION OF THE FERRIC CHLORIDE IN A CUTBACK (a) 4% of the above ferric chloride solution was dispersed at a temperature of 20° C.–30° C. in 96% of a cutback, 57% of which consisted of an 80/100 bitumen (having a penetration in the range 80 to 100 at 25° C.) and 43% of kerosene distilling between 160° C. and 230° C.

40% of the resultant dispersion were then incorporated in 60% of an 80/100 bitumen heated to about 40° C. with the use of a suitable device. There was finally obtained a cutback having a viscosity in stokes at 25° C. in the range 1600 to 2400 (a cutback of the "very viscous" type).

(b) 8% of the above ferric chloride solution was dispersed in a mixture containing 46% of a hydrocarbon oil (having a content of aromatic compounds determined by the percolation method with 22% by weight of silica gel) and 46% by weight of a solvent for cutback (kerosene distilling between 160° C. and 230° C.), this operation being carried out at a temperature in the range 20° C. to 30° C.; 80% of an 80/100 bitumen was then fluxed with 20% of the resultant dispersion. Finally a cutback of the 1600–2400 stokes types was again obtained.

(c) A cutback was prepared by taking as base bitumen 85% of 180/220 bitumen prepared according to (1) and fluxing with 15% of a solvent for cutback (kerosene distilling between 160° C. and 230° C.). A cutback having a viscosity in stokes at 25° C. in the range 600 to 1000 (a cutback of "viscous" type).

The amount of foam produced during the above operation was considerably reduced compared to the amounts produced with the use of an aqueous ferric chloride solution.

For greater certainty in order to reduce the stability of the foam formed anti-foaming agents such as silicones may also be added.

It has also been found that binders prepared in the above manner may be stored in barrels for a considerable period without deteriorating.

We claim as our invention:

1. An additive product suitable for incorporating in a bituminous composition comprising: a solution of ferric chloride in a solvent consisting of glycol containing calcium chloride in such amount that the calcium chloride to glycol ratio is at least 0.3, the calcium chloride being calculated as $CaCl_2.2H_2O$.

2. An additive product as in claim 1 in which the calcium chloride to glycol ratio is from 0.5 to 1.

3. An additive product as in claim 1 in which the ferric chloride is incorporated in the solution in the form of the crystallized hydrate $FeCl_3.6H_2O$.

4. An additive product as in claim 1 in which the ferric chloride to calcium chloride ratio is 1.5 to 30, the calcium chloride being calculated as $CaCl_2.2H_2O$ and the ferric chloride as $FeCl_3.6H_2O$.

5. The process of preparing a ferric chloride solution comprising: adding crystallized ferric chloride and crystallized calcium chloride to glycol at a temperature of about 70° C. and in such amounts that the calcium chloride to glycol ratio is at least 0.3.

6. An additive product suitable for incorporation in a bituminous composition consisting of a solution of ferric chloride in a solvent consisting of glycol containing calcium chloride in which the calcium chloride to glycol ratio is at least 0.3 and a hydrocarbon oil having a low aromatic compound content, said ferric chloride solution to hydrocarbon oil being in the raio of 0.05 to 1 part by weight of said solution to 1 part by weight of hydrocarbon oil.

7. A product comprising: bitumen and a dispersion consisting of a solution of ferric chloride in a solvent of glycol containing calcium chloride in which the calcium chloride to glycol ratio by weight is at least 0.3 and a hydrocarbon oil having a low aromatic compound content, said ferric chloride solution to hydrocarbon oil being in the ratio of 0.05 to 1 part by weight of said solution to 1 part by weight of hydrocarbon oil, said bitumen to dispersion being in the ratio of 1 to 50 parts by weight of bitumen to 1 part by weight of dispersion.

8. A process for preparing a bituminous composition comprising: preparing a dispersion containing hydrocarbon oil and ferric chloride solution, said solution being obtained by dissolving crystallized ferric chloride in a solvent consisting of glycol containing calcium chloride in such proportion that the calcium chloride to glycol ratio is at least 0.3, said hydrocarbon oil in said dispersion having a low aromatic compound content and not exceeding a ratio of 1 to 1 of said ferric chloride solution by weight, heating said dispersion to a temperature of from 30° C. to 40° C. and thereafter mixing said dispersion with bitumen heated to a temperature of about 140° C. to 160° C.

9. A process as in claim 8 in which solvent is subsequently added to form a bitumen cutback.

References Cited in the file of this patent
UNITED STATES PATENTS
2,313,759    McCoy _____ Mar. 16, 1943